L. SCHÖN.
ELECTRICAL CONNECTION.
APPLICATION FILED FEB. 20, 1912.
1,193,076.
Patented Aug. 1, 1916.
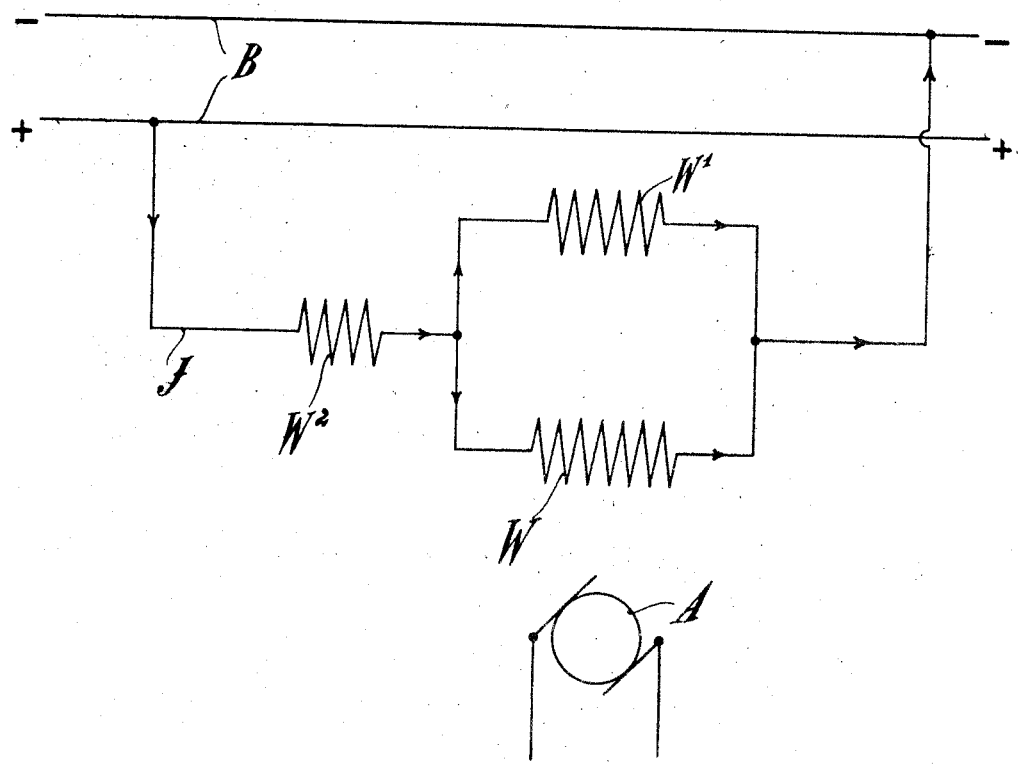
Witnesses:
Inventor.
Ludwig Schön,
By
Attorneys.

UNITED STATES PATENT OFFICE.

LUDWIG SCHÖN, OF ESSEN-ON-THE-RUHR, GERMANY, ASSIGNOR TO FRIED. KRUPP AKTIENGESELLSCHAFT, OF ESSEN-ON-THE-RUHR, GERMANY.

ELECTRICAL CONNECTION.

1,193,076.  Specification of Letters Patent.  Patented Aug. 1, 1916.

Application filed February 20, 1912. Serial No. 678,894.

*To all whom it may concern:*

Be it known that I, LUDWIG SCHÖN, residing at Essen-on-the-Ruhr, Germany, a subject of the Emperor of Germany, have invented a certain new and useful Improvement in Electrical Connections, of which the following is a specification.

In resistances that under ordinary conditions increase with the temperature, the heating of the resistance as a consequence of a passing electric current will generally cause the current strength to sink therein. In consequence of these circumstances, in separately excited motors for instance, which operate intermittently, and in which the separately excited field winding, as a rule, remains connected and which in time, while running, will experience a quite considerable heating, the current strength in the field winding as well as the number of revolutions of the motor, may change according to the heat condition of the field winding so considerably, that altogether inadmissible conditions of operation will be brought about. This disadvantage might for instance be avoided, by making the field winding of a material that practically experiences no change in resistance by heating. The known materials of this kind ("constantan" for instance) possess, however, such a low degree of conductivity, that their use for making field windings for electromotors is excluded for practical reasons.

The object of the present invention is to provide a connection for eliminating the influence of temperature, which permits of the use of resistances, consisting of the customary kind of material in practical use.

In the drawing is shown a diagrammatical representation of one embodiment of a connection of this kind.

A separately excited electromotor is indicated by letter A, its field winding W being connected to a network B of constant tension. An auxiliary resistance $W^1$ is connected in parallel with the field winding W; while still another resistance $W^2$ is connected with the branch of the circuit where the field winding W and the secondary resistance $W^1$ are arranged. As foundation for the invention lies the thought that the undivided current J, which naturally will grow less with increasing heat, will be so divided in the circuit branches, that the exciter winding W will receive an approximately constant current $i_1$, while the other branch current running through the auxiliary winding $W^1$, is diminished approximately the same amount as the undivided current J.

In the following will be examined the conditions, that have to be fulfilled, to obtain the desired results. If with $r$, $\rho$ and R are denoted the magnitude of the resistances corresponding to the windings W, $W^1$ and $W^2$ that exist at a certain moment, we find, according to Kirchhoff's law $$i_1 = \frac{E}{r+R+\dfrac{rR}{\rho}}. \quad (1)$$

In this equation, the term $$r+R+\frac{rR}{\rho}$$

may be considered as having the same value as that which the resistance must have in the exciter winding W, when by direct connection with the circuit an equal current strength would be produced therein to that in the actual connection in question. This value substitutes consequently, in a manner, the resistances $r$, R and $\rho$ with regard to the current strength $i_1$ and will therefore in the following and in the claims be referred to simply as "substitute resistance". If furthermore the temperature coefficients of the resistances W, W¹ and W² are called $\alpha, \beta$ and $\gamma$; and the increase in temperature, $\tau$, $\tau'$ and $\tau''$ experienced by these resistances at the moment under consideration, the following equations are to be found, when the magnitude of the resistances at the beginning are called $r_0$, $\rho_0$, and $R_0$:

$$r = r_0(1 + \alpha\tau),$$
$$\rho = \rho_0(1 + \beta\tau'),$$
$$R = R_0(1 + \gamma\tau''),$$

If these values are inserted in equation (1); the following is obtained:

$$i_1 = \frac{E}{r_0(1+\alpha\tau) + R_0(1+\gamma\tau'') + \frac{r_0 R_0}{\rho_0} \cdot \frac{(1+\alpha\tau)(1+\gamma\tau'')}{1+\beta\tau'}}$$

Out of this equation may be evolved the following:

$$i_1 = \frac{E}{r_0 + R_0 + \frac{r_0 R_0}{\rho_0} + \left[ r_0\alpha\tau\left(1+\frac{R_0}{\rho_0}\right) + R_0\gamma\tau''\left(1+\frac{r_0}{\rho_0}\right) - \frac{r_0 R_0}{\rho_0} \cdot \frac{\beta\tau'(1+\alpha\tau+\gamma\tau'') - \alpha\tau\gamma\tau''}{1+\beta\tau'} \right]} \quad (2)$$

In the above equation the term $$r_0 + R_0 + \frac{r_0 R_0}{\rho_0},$$

found in the denominator of the fraction, indicates the starting value of the "substitute resistance" and will in the following be denoted by $w_0$; and the term inclosed within the square brackets may be considered as the increase in the "substitute resistance" resulting from the heating.

Equation (2) clearly shows that the starting value $$i_0 = \frac{E}{r_0 + R_0 + \frac{r_0 R_0}{\rho_0}} = \frac{E}{w_0}$$

of the strength of the exciter current is constant, when the ratio is so chosen, that the increase of the "substitute resistance", i. e. the term within the square brackets, is equal to naught at every moment.

Ordinarily it is sufficient if the current strength $i_1$ of the starting state has the same value as that of the continuous state, as it then as a rule only slightly deviates from this value during the interval. If the increase in temperature of the resistances W, W¹ and W² are called respectively $\tau_m$, $\tau_{m'}$ and $\tau_{m''}$, the value $$\Delta = r_0\alpha\tau_m\left(1+\frac{R_0}{\rho_0}\right) + R_0\gamma\tau_{m''}\left(1+\frac{r_0}{\rho_0}\right) - \frac{r_0 R_0}{\rho_0} \cdot \frac{\beta\tau_{m'}(1+\alpha\tau_m+\gamma\tau_{m''}) - \alpha\tau_m\gamma\tau_{m''}}{1+\beta\tau_{m'}}.$$

will be obtained for the increase of the "substitute resistance" (compare the expression within the brackets in equation 2).

The current strength for the continuation state may be deduced from equation (2).

$$i_1 = \frac{E}{w_0 + \Delta}, \quad \text{or} \quad i_1 = \frac{E}{w_0} \cdot \frac{1}{1+\frac{\Delta}{w_0}} = i_0 \frac{1}{1+\frac{\Delta}{w_0}}. \quad (3)$$

Should now the strength of the exciter current have the same value for both the starting and the continuation state, the stipulation $$\frac{\Delta}{w_0} = 0 \quad (4)$$

must be fulfilled, which will be clear from equation (3). This stipulation may also be written in this form $$r_0\alpha\tau_m(\rho_0+R_0) + R_0\gamma\tau_{m''}(\rho_0+r_0) - r_0 R_0 \cdot \frac{\beta\tau_{m'}(1+\alpha\tau_m+\gamma\tau_{m''}) - \alpha\tau_m\gamma\tau_{m''}}{1+\beta\tau_{m'}} = 0 \quad (4')$$

if the above given value of $\Delta$ is inserted and some deductions made. Frequently it is not necessary that the stipulation equation (4) or (4') is completely fulfilled; but it will suffice if the value $$\frac{\Delta}{w_0}$$

is at least approximately equal to naught which may be regarded as the value of ratio of increase in the substitute resistance during the continuation state. In that case equation (3) may also be written in this form $$i_1 = i_0\left(1 - \frac{\Delta}{w_0}\right) \quad (3')$$

This equation permits one to judge how much the value $$\frac{\Delta}{w_0}$$

may deviate from naught. If, for instance, a deviation of 5% were considered permissible for the starting and continuation state in the strength of the exciter current, the value $$\frac{\Delta}{w_0}$$

may then deviate from naught by as much as 0.05, which follows according to equation (3′).

In the following will be given a short explanation of the procedure of calculation by the use of the developed designations. The values of $i_0$, $r_0$, $\alpha$, $\beta$ and $\gamma$ may be considered as known. Furthermore the increases in temperature $\tau_m$, $\tau_{m\prime}$, and $\tau_{m\prime\prime}$ may be deliberately chosen within permissible limits. From the stipulated equation (4′)

$$r_0\alpha\tau_m(\rho_0+R_0)+R_0\gamma\tau_{m\prime\prime}(\rho_0+r_0)-r_0R_0\cdot\frac{\beta\tau_{m\prime}(1+\alpha\tau_m+\gamma\tau_{m\prime\prime})-\alpha\tau_m\gamma\tau_{m\prime\prime}}{1+\beta\tau_{m\prime}}=0$$

together with equation $$i_0=\frac{E}{r_0+R_0+\dfrac{r_0R_0}{\rho_0}}$$

the two unknown quantities $R_0$ and $\rho_0$, only appearing in these two equations, may be found, and also the corresponding values for the continuation state $$R_0(1+\gamma\tau_{m\prime\prime})$$

and $$\rho_0(1+\beta\tau_{m\prime}).$$

By the use of Kirchhoff's law, the existing current strengths in the continuation state of the resistances $W^1$ and $W^2$ may then be computed. The current strength in the field winding W is naturally again equal to $i_0$ in the continuation state. By a suitable choice of the ratio of cooling, care is lastly to be taken, that the increases in temperature $\tau_m$, $\tau_{m\prime}$, and $\tau_{m\prime\prime}$ chosen for the continuation state, actually appear in the resistances W, $W^1$ and $W^2$, under the influence of the current strengths appearing in the continuation state. The computation will be especially simple if a material is chosen for the first connected resistance $W^2$, that has a temperature coefficience practically equal to naught. The magnitudes, which may be used, within certain limits, in this computation, should consequently be so chosen, that the sum of the heat quantities produced in the two auxiliary resistances $W^1$ and $W^2$, should be the smallest possible, as it represents a loss, with which the elimination of the influences of the temperature on the current strength in the exciter winding will have to be bought.

I claim:—

1. In a dynamo machine having a field winding excited from a source of constant voltage, electric connections for eliminating the influence of the heating of the field winding by the flowing electricity; said connections comprising a circuit branch containing said field winding and a first auxiliary resistance connected in parallel therewith and two conductors connecting said circuit branch with said source of voltage, one of said conductors containing a second auxiliary resistance through which the undivided current runs, the magnitudes and the temperature-coefficients of said auxiliary resistances, being so chosen, that any alteration of the value of said resistances due to the heating of the field winding by the flowing electricity causes the current supplied to said first auxiliary resistance to alter approximately at the same rate as the current of said second auxiliary resistance, while the current supplied to said field winding remains approximately constant.

2. In a dynamo machine having a field winding excited from a source of constant voltage, electric connections for eliminating the influence of the heating of the field winding by the flowing electricity; said connections comprising a circuit branch containing said field winding, and a first auxiliary resistance connected in parallel therewith, and two conductors connecting said circuit branch with said source of voltage, one of said conductors containing a second auxiliary resistance through which the undivided current runs, the magnitudes and the temperature-coefficients of said auxiliary resistances and their ratio of cooling, being so chosen, that any alteration of the value of said resistances due to the heating of the field winding by the flowing electricity causes the current supplied to said first auxiliary resistance to alter approximately at the same rate as the current of said second auxiliary resistance, while the current supplied to said field winding remains approximately constant.

The foregoing specification signed at Barmen Germany this 30th day of January, 1912.

LUDWIG SCHÖN. [L. S.]

In presence of—

• ALBERT NUFER.